Nov. 7, 1944.　　　N. J. PETERS　　　2,362,089
CHEESE PRESSING APPARATUS
Filed July 24, 1942　　　3 Sheets-Sheet 1
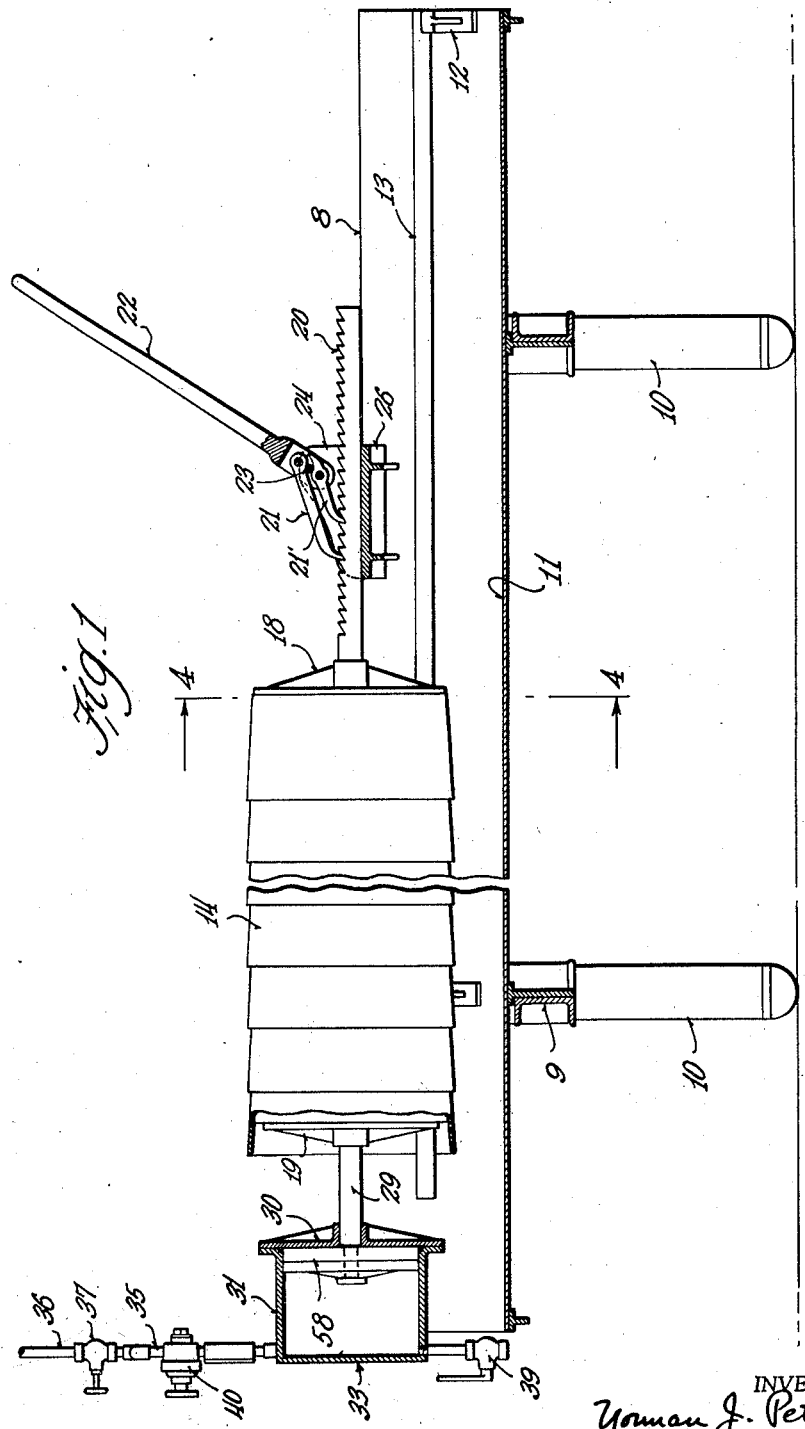

Nov. 7, 1944.                N. J. PETERS                2,362,089
                        CHEESE PRESSING APPARATUS
                    Filed July 24, 1942        3 Sheets-Sheet 2
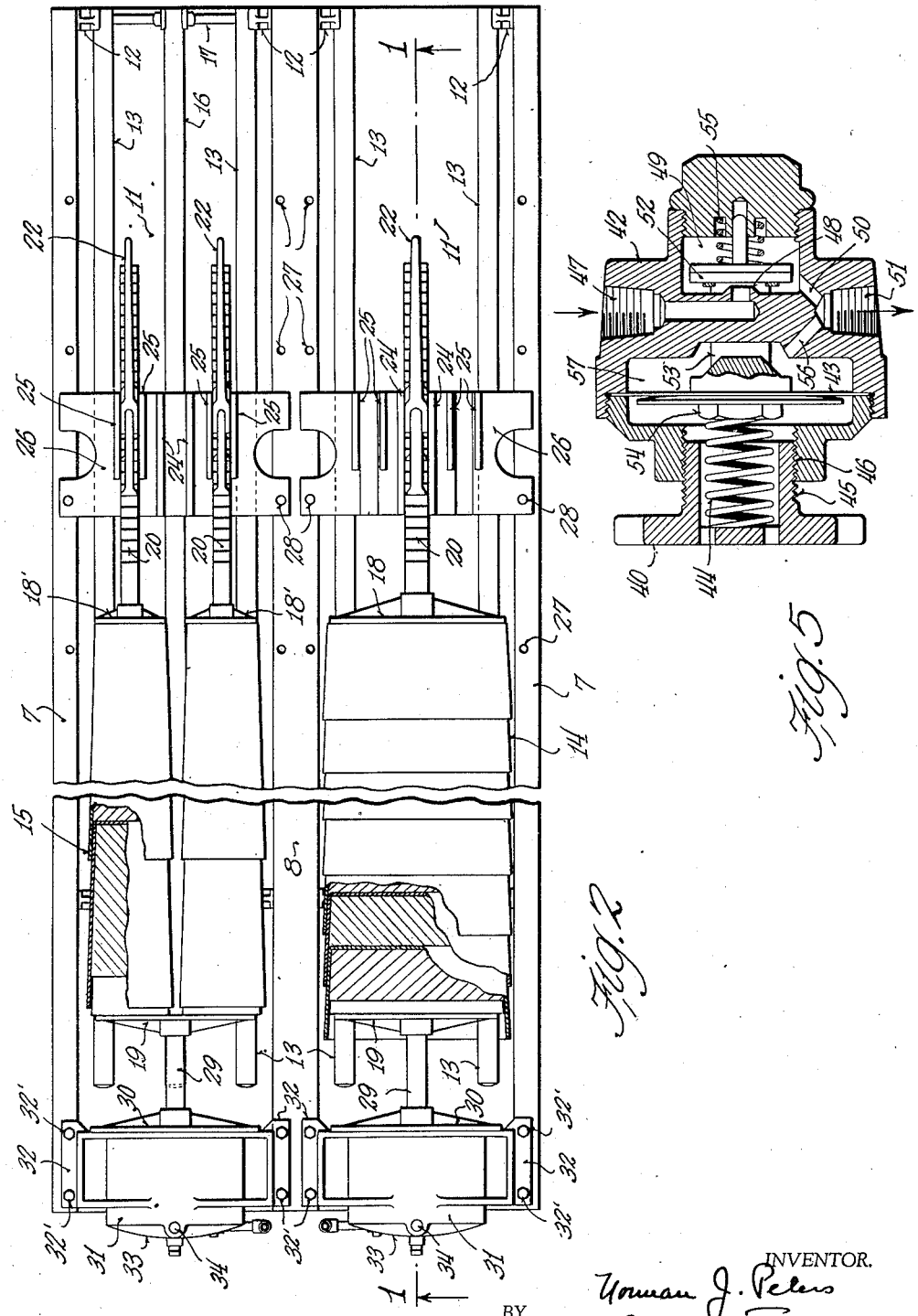
INVENTOR.
Norman J. Peters
BY Charles & French
            ATTORNEYS.

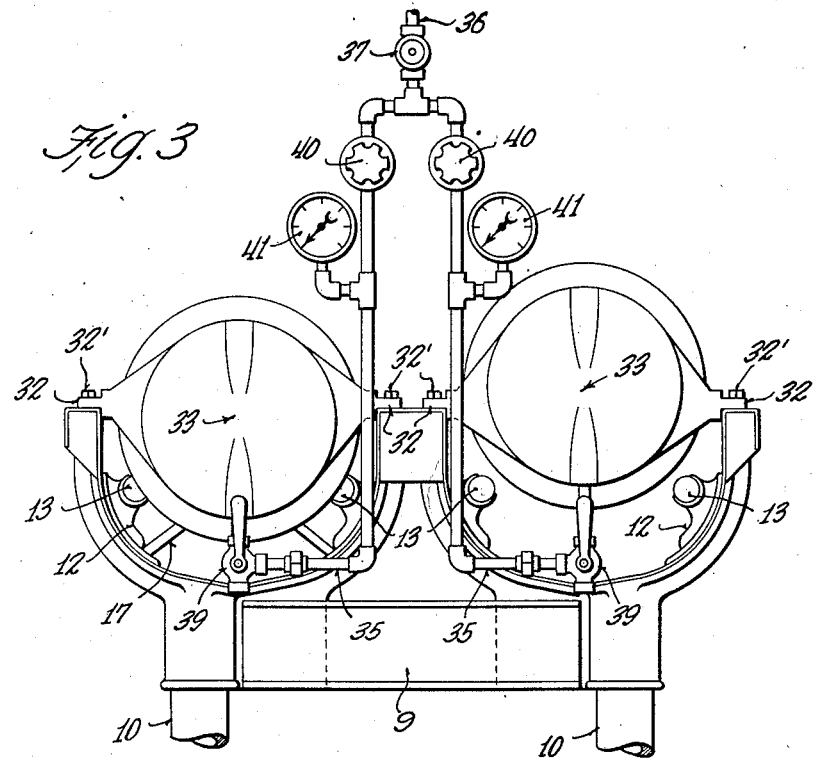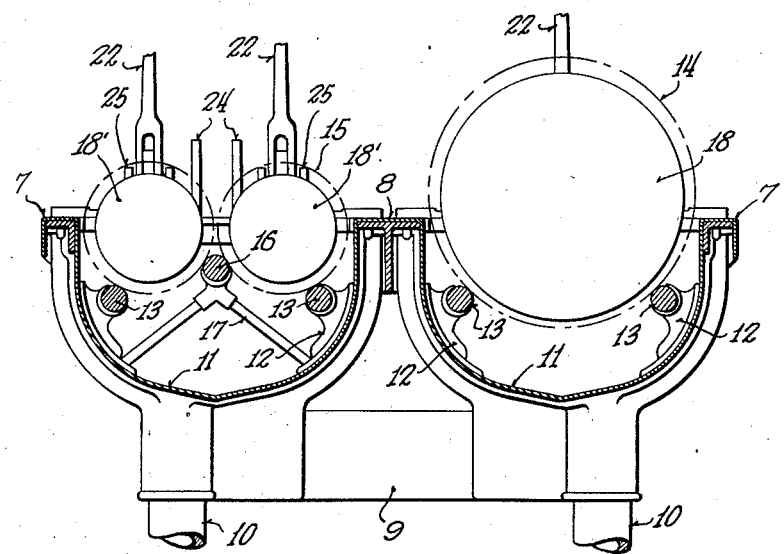

Patented Nov. 7, 1944

2,362,089

UNITED STATES PATENT OFFICE 2,362,089

CHEESE PRESSING APPARATUS

Norman J. Peters, Fond du Lac, Wis., assignor to Damrow Brothers Company, Fond du Lac, Wis., a corporation of Wisconsin Application July 24, 1942, Serial No. 452,179

2 Claims. (Cl. 100—55)

The invention relates to cheese presses.

The object of the invention is to provide an hydraulically operated cheese press whose pressure may be readily varied to suit the different types of cheeses being produced and in which the press units for the different sizes or kinds of cheese may be arranged between the cheese vats and supplied with hydraulic fluid from a single source of pressure supply. According to the present invention any amount of pressure desired can be applied to the cheese. Cheese varies in size depending on the molds used, and these take more or less pressure. The present invention permits the adjusting of this pressure. The presses are preferably built in units of two or more, so that one press will handle cheese curd from one vat and the other press another vat of curd, but these presses are not tied together as in conventional presses, one row of which has to be released to balance the row without pressure. With the present invention the general operation of the press is not affected by the number of cheeses being treated as the pressing force can be varied to suit the number of cheeses being pressed.

A further object of the invention is to provide an hydraulic pressing head for cheese presses which may be used for pressing two rows of small cheeses or one row of larger cheeses.

The invention further consists in the several features hereinafter set forth and more particularly defined by claims at the conclusion hereof.

In the drawings:

Fig. 1 is a vertical sectional view taken on the line 1—1 of Fig. 2;

Fig. 2 is a plan view of the pressing apparatus, parts being broken away and parts being shown in section;

Fig. 3 is an end view of the pressing apparatus;

Fig. 4 is a detail transverse vertical sectional view taken on the line 4—4 of Fig. 1;

Fig. 5 is a detail longitudinal sectional view through one of the regulator valves.

Referring to Figs. 1 to 5 of the drawings, the pressing apparatus includes a frame having lengthwise extending angled metal side beams 7 and a central T-beam 8, these beams being welded or otherwise fixedly secured to transversely extending metal partitions 9 which are provided with sockets to receive the tubular metal legs 10. Troughs 11 of sheet metal are formed to be supported on the beams 7 and the beam 8, these troughs being here shown as formed from a single sheet of metal.

Sets of brackets 12 are fixedly mounted in each trough at spaced intervals and carry guide rods 13 extending lengthwise of the troughs. These rods act as supports for the cheese hoops 14 in the case of large cheeses and also as one of the supports for the cheese hoops 15 of the smaller cheeses which are also supported by a central rod 16 which is carried by sets of bracket arms 17 that engage at their bases with parts of the brackets 12 as shown in Fig. 4. The cheeses in the cheese hoops are subjected to pressure between a relatively fixed ram 18 or 18' and an hydraulically operated ram 19. Each row of cheese hoops has its own fixed ram, but for the smaller cheese a single hydraulic ram 19 is used for two rows of cheeses. The fixed rams 18 or 18' are each of similar construction and each has a rack operating bar 20 which is alternately engageable by operating and locking pawls 21 and 21', pivotally mounted on an operating lever 22 which is adapted to be detachably secured by a pivot pin 23 to either the spaced support and guide arms 24 or 25 of bracket 26 extending across each trough 11 and adapted to be secured at different distances along the length of the trough by pins 28 on said bracket engageable with any one set of a series of sets of holes 27 in the frame of the apparatus. These fixed rams 18 or 18' act as adjustable abutments for one end of the row of cheeses and under the action of the pawl carrying lever 22 are adapted to be moved forwardly before taking the pressed cheeses from the press. They are also used to press the molds between them and the ram 19 before the hydraulic pressure is applied to be sure the hoops are drawn tightly together and to be sure the ram is reversed so as to have the full pressing stroke.

Each ram 19 has a rod 29 slidably mounted in the end plate 30 of an hydraulic cylinder 31 which has anchoring lugs 32 formed integral therewith and offset laterally from the axis of said cylinder, so that the axis of said cylinder will occupy different positions relative to the troughs 11 depending upon the size of cheeses being handled. For example, for small cheeses, such as longhorns, the hydraulic cylinder is arranged with its axis or center 33 below the plane of the lugs 32, and for larger cheeses the said axis is arranged above the lugs 32 as shown at the right of Fig. 3. The lugs 32 are adapted to receive the clamping bolts 32' connecting the cylinders to the framework of the apparatus. It will be noted from Figs. 3 and 4 that when the hydraulic cylinder 31 is disposed so that its axis is below the plane of the lugs 32 as shown at the left of Figs. 3 and 4, that the two smaller fixed rams 18' are used in conjunction with the hydraulic ram 19 working in this cylinder, and that when the axis is arranged above the lugs as shown at the right of Figs. 3 and 4, the axis of the ram 18 is substantially coincident therewith, it being noted that the separate sets of brackets 24 and 25 shown in Fig. 2 permit the positioning of the rams 18' and 18 as shown in Figs. 3 and 4 and permit the changing of these rams for either of the troughs. The fluid pressure supply opening 34 is provided at both the top and bottom of one end of the cylinder 31, so that either one of these can be used to take care of the cheeses being handled, and a supply pipe 35 is connected to the lower of these openings, the other being plugged, each pipe leading to a common source of supply 36 controlled by a cut off valve 37. Each pipe 35 also includes a three-way valve 39 to connect the cylinder to the supply through pipe 35 or directly to waste while cutting off the supply fluid and a manually operated pressure regulating valve 40 which is readily set with the aid of the pressure gauge 41 connected with the pipe 35. The pressure regulating valves 40 may be of any suitable construction, and by way of example I have shown one structure suitable for this purpose in section in Fig. 5. This structure includes a two part casing 42 between the sections of which a diaphragm 43 is clamped. A pressure regulating spring 44 bears on one side of this diaphragm and is adjustably tensioned thereagainst by a hand operated nut 45 in adjustable threaded engagement at 46 with the casing 42. Pressure fluid enters the casing 42 at the inlet 47 and flows past a valve seat 48 to a chamber 49 connected by a passage 50 with the outlet 51. The flow past the seat 48 is controlled by the valve 52 which is connected to the arms of a yoke 53 whose transverse portion is clamped by the nut 54 to the diaphragm 43. The valve 52 may be biased in one direction towards a closing position by a spring 55. With this construction when the nut 45 is loosened, the tension of the spring 44 acting against the diaphragm 43 is decreased with the result that the pressure fluid entering at 47 acts against the valve 52 to open the same and allow fluid under pressure to pass from the inlet 47 to the outlet 51 and also through a passage 56 into a chamber 57 at the opposite side of the diaphragm 43 from the spring 44, and when the pressure of this fluid exceeds a certain predetermined pressure for which the spring 44 is set, it acts against the diaphragm 43 to oppose the pressure of the spring 44 and moves the valve 52 to a closed position, so that the fluid is at a predetermined maximum pressure when introduced into the pipe 35 and to the head end of the cylinder 31, and this predetermined pressure may be varied by varying the tension of the opposing spring 44 by the screwing in or out of the nut 45. Thus the pressure of the fluid acting on each ram 19 may be varied to suit the size of the cheeses being handled and one of these rams may, as shown in the drawings, be used to act on two rows of smaller cheeses, though while these cheeses are being pressed, another row of larger cheeses may also be prepared for pressing or pressed at pressures differing from those of the smaller cheeses by the adjusting of the pressure valve for this part of the apparatus. When the fluid pressure is on, the valve 39 is, of course, out of register with its drain opening, and the water or other liquid under pressure is free to flow through the pipe 35 into the end of the cylinder 31 and acts on a piston 58 slidably mounted in the cylinder 31 and secured to rod 29. The total travel of the piston 58 is relatively short, but it requires several hours to move forward this distance because the cheese in the hoops presses slowly. Under the pressing operation the excess whey in the curd is pressed out of the same, and the curd becomes a relatively solid mass. When this mass has been pressed to the desired consistency, the valve 39 is moved to cut off the further passage of fluid under pressure to the particular cylinder 31 and open its drain opening to allow the operating fluid to drain from the cylinder. This draining is facilitated by inching the piston 58 back to its initial position adjacent the supply end of the cylinder 31 by moving the whole nest of cheese hoops rearwardly by the action of the lever 22 with its pawls 21 and 21' upon the rack operating bar 20, which bar acts to move its ram 18 or 18' rearwardly with the rest of the cheese hoops and the pressing ram 19. This operation may be accomplished without effecting the operation of the other unit of the press since the pressure of the fluid introduced into the hydraulic cylinder of this unit is determined by the other pressure valve 40 in its supply line.

While I have shown and described an arrangement for handling large cheeses in one trough and smaller cheeses in the other, it will be understood that the last mentioned trough can also be used for larger cheeses or that the trough shown in connection with the larger cheeses can be used for smaller cheeses and that various combinations can be effected for handling cheeses of different sizes.

I desire it to be understood that this invention is not to be limited to any particular form or arrangement of parts except in so far as such limitations are included in the claims.

What I claim as my invention is:

1. In a cheese pressing apparatus having a frame, a pressing head comprising a horizontally disposed hydraulic cylinder having laterally disposed anchoring lugs intermediate the top and bottom of said cylinder but offset from a horizontal plane passing through the axis of the cylinder so as to displace said axis farther or nearer to said frame, to which said lugs are secured, depending upon which side of said lugs are uppermost, a ram structure including a piston working in said cylinder, and means for supplying said cylinder with operating fluid for moving said piston.

2. In a cheese pressing apparatus having a frame, a pressing head comprising an hydraulic cylinder having anchoring lugs offset from the axis of the cylinder so as to displace said axis farther or near to said frame, to which said lugs are secured, depending upon which side of said lugs are uppermost, a ram structure including a piston working in said cylinder, means for supplying said cylinder with operating fluid for moving said piston, a relatively fixed large ram and relatively fixed smaller rams, a support for selectively taking said large ram or the smaller rams, the axis of said large ram being substantially coincident with the axis of said cylinder when its axis is farther from said frame and the axis of the smaller rams being in a plane substantially coincident with the axis of said cylinder when its axis is nearer to said frame.

NORMAN J. PETERS.